United States Patent [19]
Sherman

[11] 3,787,820
[45] Jan. 22, 1974

[54] SYSTEM FOR TRANSFERRING DATA

[75] Inventor: Frederick A. Sherman, Levittown, Pa.

[73] Assignee: GTE Information Systems Incorporated, Stamford, Conn.

[22] Filed: Dec. 29, 1972

[21] Appl. No.: 319,507

[52] U.S. Cl. .......... 340/172.5, 179/15 A
[51] Int. Cl. .......... G06f 3/00
[58] Field of Search .......... 340/172.5; 179/15 A

[56] References Cited

UNITED STATES PATENTS

| | | | |
|---|---|---|---|
| 3,735,354 | 5/1973 | Delaney et al. | 340/172.5 |
| 3,482,213 | 12/1969 | Bennett et al. | 340/172.5 |
| 3,526,878 | 9/1970 | Bennett et al. | 340/172.5 |
| 3,462,743 | 8/1969 | Milewski | 340/172.5 |
| 3,573,752 | 4/1971 | Lyghounis | 179/15 |
| 3,581,286 | 5/1971 | Beausoleil | 340/172.5 |
| 3,599,160 | 8/1971 | Nestle et al. | 340/172.5 |
| 3,618,037 | 11/1971 | Wollum et al. | 340/172.5 |
| 3,639,909 | 2/1972 | Hauck et al. | 340/172.5 |
| 3,692,942 | 9/1972 | Inose et al. | 179/15 A |

*Primary Examiner*—Paul J. Henon
*Assistant Examiner*—John P. Vandenburg
*Attorney, Agent, or Firm*—David M. Keay; Elmer J. Nealon; Norman J. O'Malley

[57] ABSTRACT

Apparatus for transferring messages received at any of four inputs to any of 512 outputs. Messages of 64 bits each may be present on any of four data input lines simultaneously. A 9-bit address identifying an output line is provided with each message on an associated address line. The 64 data bits of each message received during a 64-bit message input period are stored in a memory array. The four most significant bits (MSB) of each address are stored in one memory array and the five least significant bits (LSB) of each address are stored in another memory array. During the next 64-bit period the five LSB's of the stored addresses are compared with the count of a 5-bit (32 count) counter. When a comparison occurs, the appropriate four MSB's of the address are read out of the memory array and the 64 data bits are also read out of the memory. The four MSB's of the address are decoded to select the proper one of 16 groups of 32 output lines to which the data is to be directed. The 64 bits of data are received in parallel and accepted by the proper output group. Under control of the 5-bit counter, the output group converts the data from parallel to serial form and demultiplexes the serial data to direct it to the proper one of the 32 output lines of the group. The apparatus includes a second set of data and address memories so that a second set of messages can be received and stored while the information in the first set is being read out.

5 Claims, 8 Drawing Figures

SYSTEM FOR TRANSFERRING DATA

BACKGROUND OF THE INVENTION

This invention relates to apparatus for receiving information on several input lines and for selectively transferring the information to a plurality of output lines. More particularly, it is concerned with apparatus for receiving digital data on any one of several input lines in association with an output line address and for transferring the data to the designated output line.

In the handling of data in digital format it is frequently necessary to transfer data appearing on certain lines to any one of a large number of output lines, the output line address being included with the data. The data together with the appropriate address is received, stored in a suitable memory arrangement, the address analyzed to select the proper output line, and the data read out over the output line. Various difficulties are encountered in employing known systems for handling data in this manner. These problems include receiving several data messages at one time and receiving a second set of messages before the previous messages are completely retransmitted. In addition, in systems having a large number of output lines, there are difficulties caused by the complexity of the equipment and the amount of time required to analyze the address information, select the proper output lines, and read out the data over the output lines.

SUMMARY OF THE INVENTION

Data transfer apparatus in accordance with the present invention provides for receiving data messages on several input lines at the same time and also for receiving additional messages on the input lines before the previous messages have been retransmitted over the proper output lines. The apparatus includes a plurality of input channels for receiving messages and a plurality of output channels. Each message includes data information and associated output address information. The data information of each message is stored in first data storage means and the output address information is stored in first address storage means when they are enabled. Alternatively, the data information of each message is stored in second data storage means and the output address information is stored in second address storage means when they are enabled. A control means enables the first data storage means and the first address storage means to store information received on the input channels during a first period, and enables the second data storage means and the second address storage means to store information received on the input channels during a second period.

Output address information stored in one of the address storage means is analyzed by an analyzing means to determine the particular one of the output channels that it designates, and the analyzing means produces an indication of the particular output channel. In response to the producing of an indication, a readout means reads out the associated data information from a data storage means. The control means causes the analyzing means to analyze the output address information stored in the second address storage means and causes the readout means to read out the associated data information from the second data storage means during a first period. During a second period the control means causes the analyzing means to analyze the output address information stored in the first address storage means and causes the readout means to read out the associated data information from the first data storage means. An output means is coupled to the first and second data storage means, to the output channels, and to the analyzing means. The output means applies data information read out of a data storage means to the particular one of the output channels as determined by the indication from the analyzing means.

BRIEF DESCRIPTION OF THE DRAWINGS

Additional objects, features, and advantages of signal transfer apparatus in accordance with the present invention will be apparent from the following detailed discussion together with the accompanying drawings wherein.

DETAILED DESCRIPTION OF THE INVENTION

GENERAL

Figure 1:
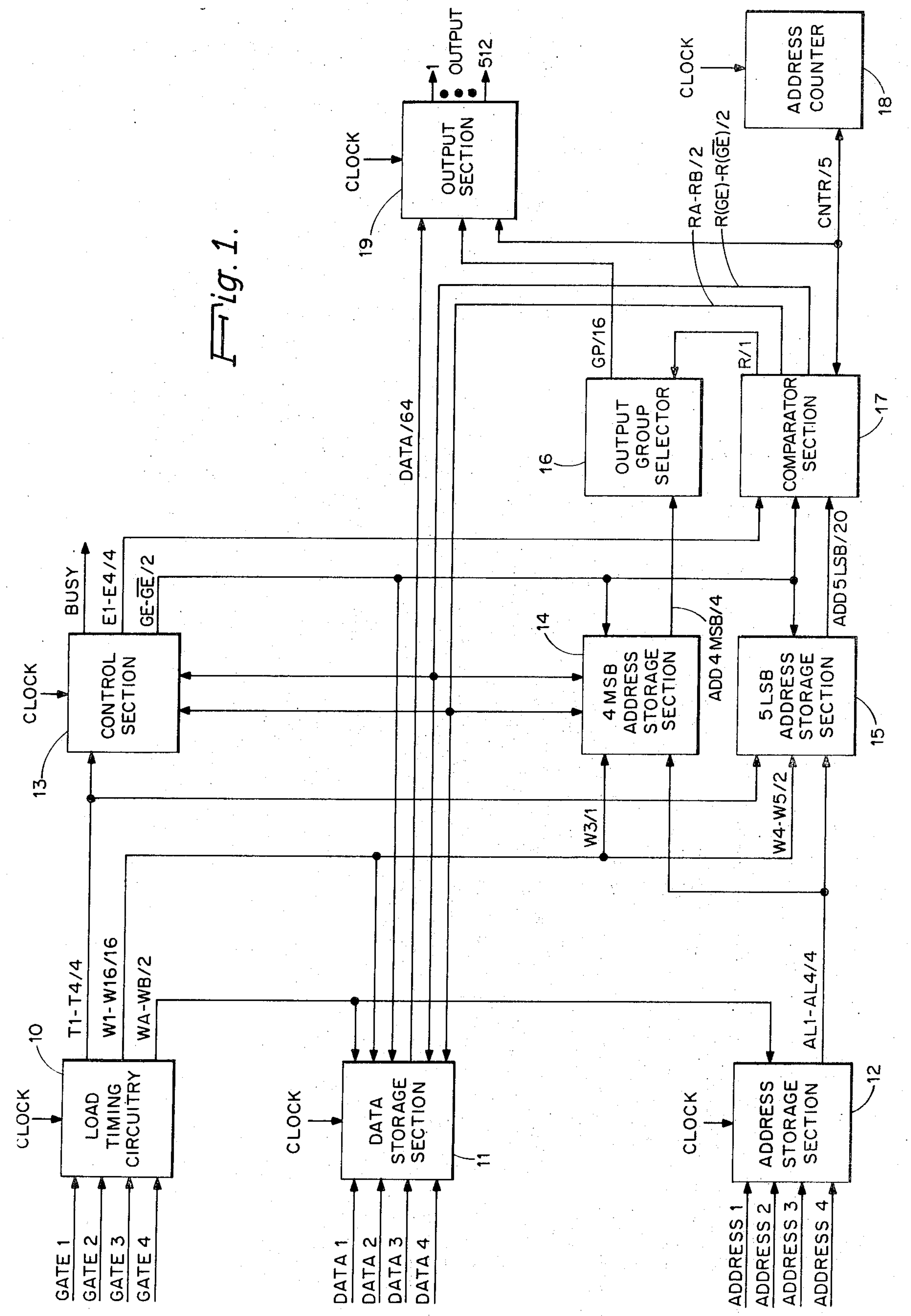
FIG. 1 is a block diagram of a data transfer system in accordance with the present invention.

The system as illustrated by the specific embodiment of FIG. 1 provides for receiving messages on up to four input channels and for retransmitting the data on any one of 512 output channels. For each input channel data is received on a data input line and is accompanied by an output line address on an associated address line. Each output channel is an output line. In this illustrative embodiment each message contains 64 bits of data in serial format and each address contains 9 bits in serial format to identify a particular one of the 512 output lines. A 64-bit transfer gate signal which is coextensive with the data and the address information accompanies each message on an associated gate line. The gate signal may be generated by the data or may be produced separately. The gate signal is employed to operate load timing circuitry 10 which generates various gate and clock pulses utilized by the system for timing and control.

The data content of messages is received over input lines designated DATA 1, DATA 2, DATA 3, and DATA 4. A 64-bit message may be received over any or all of the data lines simultaneously during a 64-bit message input period. The data on each line is stored in an appropriate portion of a data storage section 11.

At the same time the associated address information is received over lines designated ADDRESS 1, ADDRESS 2, ADDRESS 3, and ADDRESS 4. The address storage control 12 together with signals from the load timing circuitry 10 control the 4 MSB address storage section 14 and the 5 LSB address storage section 15.

The four most significant bits (MSB's) of each address are stored in an appropriate portion of the 4 MSB address storage section 14, and the five least significant bits (LSB's) of each address are stored in the 5 LSB address storage section 15.

After a set of messages has been received, the system is checked to determine if previous message information has been cleared so that the system is in condition for further processing of the information just received. This procedure is performed in a control section 13. If the system is clear, the control section 13 produces enabling signals which permit the stored address information to be analyzed by a comparator section 17.

The five least significant bits of each address stored in the 5 LSB storage section 15 are compared with the count from an address counter 18 by the comparator section 17. The address counter 18 repeatedly counts through a count of 32; that is, 5 bits. When a comparison match occurs, read out signals from the comparator section 17 cause the four most significant bits of the same address to be read out of the 4 MSB address storage section 14 and applied to an output group selector 16. At the same time, the read out signals cause the 64 bits of data associated with that address to be read out in parallel from the data storage section 11 and applied over a data bus to an output section 19. The output group selector 16 decodes the 4 MSB's of the address and produces a signal on one of 16 lines which enables one of 16 segments of the output section 19 to accept the data from the data bus. The output section 19 has 16 segments, each including a group of 32 output lines. Thus, the output section 19 has a total of 512 (16 × 32) output lines.

The proper segment of the output section 19 has enabled by the signal from the output group selector 16 receives the 64 data bits in parallel. By virtue of connections to the address counter 18 the operation of the output segment is in phase with the address counter so that the time of receiving and accepting the data by the output segment indicates the 5 LSB's of its address; that is, the count present in the counter 18 at the time the data is received indicates which of the 32 output lines of the group is to receive the data. The data is converted from parallel to serial format in the segment of the output section 19, and is applied to the proper output line under control of the address counter 18.

LOAD TIMING CIRCUITRY

Figure 2:
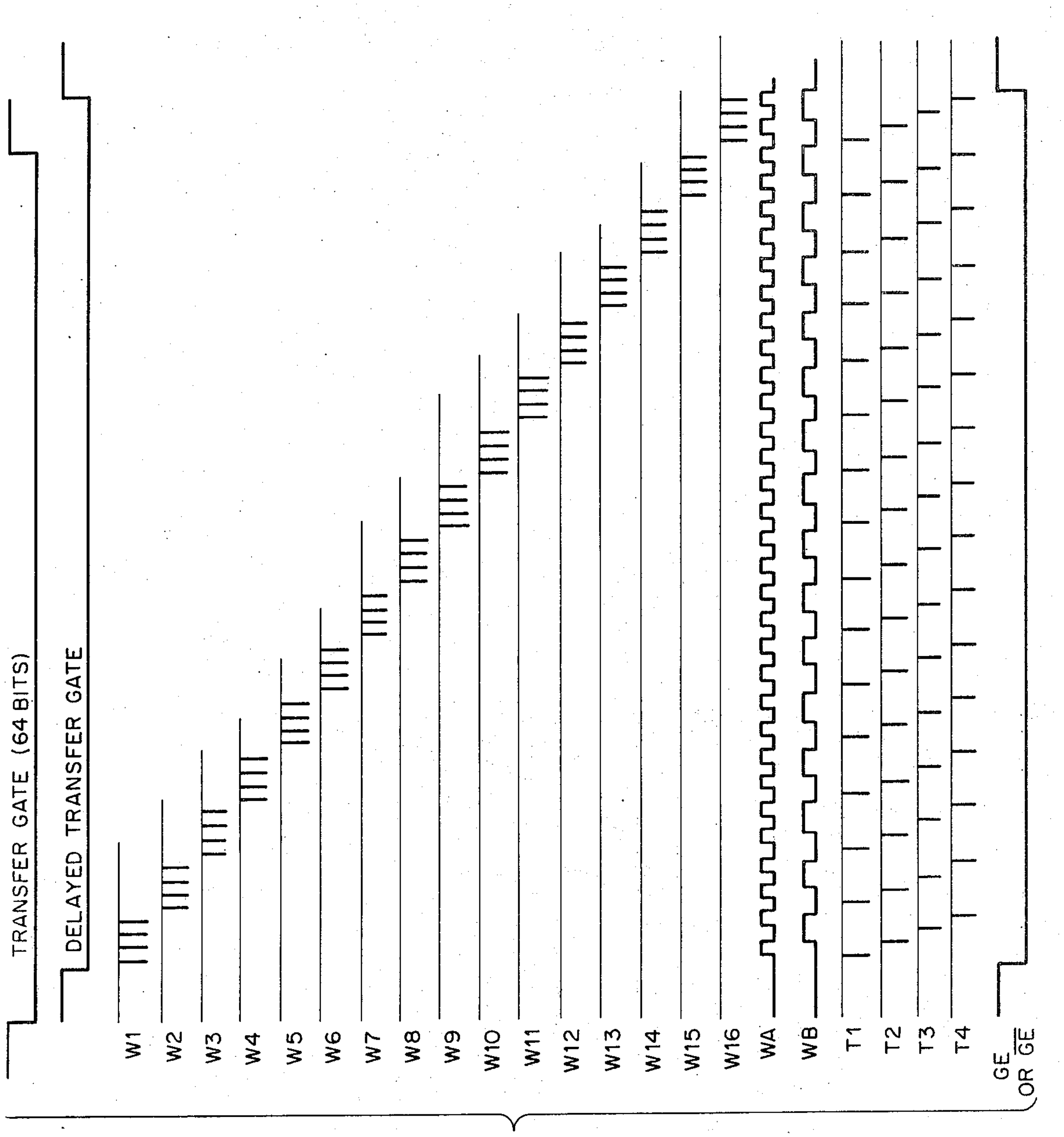
FIG. 2 is a timing diagram of various gating and clock pulses which are employed in the system of FIG. 1.

The load timing circuitry 10 operates in response to transfer gate signals on lines GATE 1, GATE 2, GATE 3, and/or GATE 4 to produce various gating and clock pulses at its outputs as shown in the timing diagram of FIG. 2. As mentioned previously, a transfer gate signal accompanies each message on the associated DATA and ADDRESS lines and is coextensive therewith, lasting 64 bits.

Each transfer gate signal is delayed 4 bits by the load timing circuitry 10. The presence of one or more transfer gate signals cause the load timing circuitry 10 to produce several series of four gating pulses W1 through W16, as shown in FIG. 2, on the respective 16 output lines. Each series of four gating pulses occurs at the bit rate of the incoming data which is 768 KHz. The pulses are delayed by ¼ bit from the data so as to provide center sampling gate pulses.

The load timing circuitry 10 also produces two sets of square-wave clock pulses WA and WB. The WA clock pulses are at the rate of 387 KHz and appear on line WA, and the WB clock pulses are at the rate of 192 KHz and appear on line WB. The four possible combinations of output levels of clock pulses WA and WB repeat during every period of four data bits thus serving to identify each of the four pulses of each of the series of gating pulses W1–W16.

Gating pulses T1, T2, T3, and T4 are produced on the appropriate output lines of the load timing circuitry 10 in response to transfer gate signals on the respective lines GATE 1, GATE 2, GATE 3, and GATE 4. If there is a transfer gate signal present on the GATE 1 line, a T1 pulse is produced at the same time as the first gating pulse of each series of pulses W1–W16. Similarly, if there is a transfer gate signal present on the GATE 2 line, a T2 pulse is produced at the same time as the second gating pulse of each of the series of pulses W1–W16. In the same manner T3 and T4 gate pulses are produced on the third and fourth gating pulses of the series of pulses W1–W16 in response to transfer gate signals on the GATE 3 and GATE 4 lines, respectively.

RECEIVING AND LOADING INFORMATION

Figure 3:
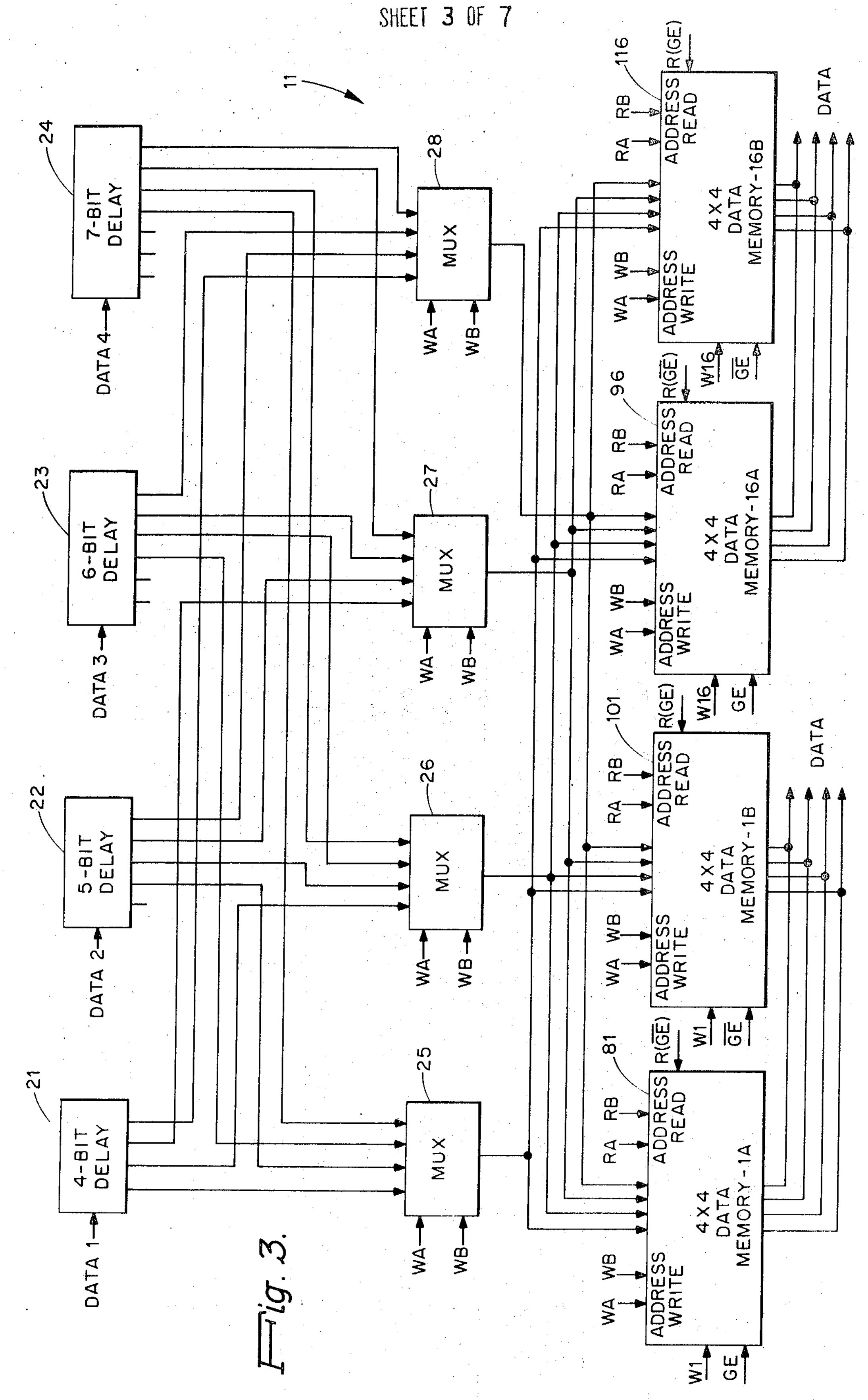
FIG. 3 is a detailed block diagram of the data storage section of the system of FIG. 1.

The 64 data bits of up to four messages are received at the data input lines DATA 1, DATA 2, DATA 3, and/or DATA 4 and loaded into the data storage section 11, which is illustrated in detail in FIG. 3. The data storage section 11 includes 32 4 × 4 memories, 16 of which are arranged in an A set 81–96 and 16 of which are arranged in a B set 101–116. Only one set of memories, either A or B, is employed for storing a set of messages during one message input period.

Each data input line is connected to a delay; DATA 1 to a 4-bit delay 21, DATA 2 to a 5-bit delay 22, DATA 3 to a 6-bit delay 23, and DATA 4 to a 7-bit delay 24. Outputs are taken from the last four stages of each of the delays and applied to four multiplexers 25, 26, 27, and 28 each of which has four inputs. The first output of each of the delays 21, 22, 23, and 24 is connected to the inputs of the first multiplexer 25, the second output of each of the delays is connected to the inputs of the second multiplexer 26, the third output of each of the delays is connected to the inputs of the third multiplexer 27, and the fourth output of each of the delays is connected to the inputs of the fourth multiplexer 28. The outputs of the four multiplexers are each connected to a different one of the four data inputs of the 32 memories 81–96 and 101–116.

The multiplexers 25, 26, 27, and 28 are operated by clock pulses WA and WB. Each multiplexer thus repeatedly samples its four inputs in sequence. Sampling is at the bit rate and is repeated every four bits.

The level at which data bits applied at the four data inputs to the memories 81–96 and 101–116 are written into the memories is also determined by the WA and WB clock pulses. Each memory is enabled to store data by the presence of an appropriate GE or $\overline{GE}$ signal and the W1–W16 gating pulses. The GE and $\overline{GE}$ signals, shown in FIG. 2, are produced by the control section 13 as will be explained hereinbelow, and one or the other is produced as a constant signal during each 64-bit message input period as shown in FIG. 2. The A set of memories 81–96 is enabled by a GE signal and the B set 101–116 is enabled by a $\overline{GE}$ signal.

Assuming the presence of a GE signal the apparatus of FIG. 3 operates to load the first four bits of data on the first input line DATA 1 into the four storage locations of the first level of memory-1A 81, the first four bits of data on the second input line DATA 2 into the four storage locations of the second level of memory-1A, the first four bits of data on input line DATA 3 into the third level, and the first four bits of data on input line DATA 4 into the fourth level. The fifth, sixth, seventh, and eighth bits of data on the four input lines DATA 1 – DATA 4, that is, the next sets of four bits, are loaded into the corresponding levels of the next memory of the set. Upon completion of loading, the 64 bits of data received on input line DATA 1 are stored in the first levels of the 16 memories 81–96, the data received on line DATA 2 is in the second levels, the data received on line DATA 3 is in the third levels, and the data received on line DATA 4 is in the fourth levels.

The apparatus accomplishes the loading of data into the memories in the following manner. During the period of the first four bits of a 64-bit message input period, the first four stages of the delays 21, 22, 23, and 24 receive the first four bits of data from their respective input lines. With the data in these locations, the WA and WB clock pulses cause the multiplexers 25, 26, 27, and 28 to accept the data on their first inputs. This data is the first four bits of data from line DATA 1 which is in the four stages of the 4-bit delay 21. The first W1 gate pulse, together with the WA and WB clock pulses, cause the data to be loaded into the four storage locations of the first level of memory-1A 81. During the next bit period data is shifted one stage to the right in the delays 21, 22, 23, and 24, and then the WA and WB clock pulses cause the multiplexers 25, 26, 27, and 28 to accept the data on their second inputs. This data is the first four bits of data from line DATA 2 which is in the second, third, fourth, and fifth stages of the 5-bit delay 22. The second W1 gate pulse, together with the WA and WB clock pulses, cause this data to be loaded into the four storage locations of the second level of memory-1A 81.

During the next bit period, data is shifted one more stage to the right in the delays and the first four bits of data from line DATA 3 is read out from the last four stages of the 6-bit delay 23 through the third inputs of the multiplexers 25, 26, 27, and 28, and loaded during the third W1 gate pulse into the storage locations of the third level of memory-1A. In a similar manner data from line DATA 4 is read out of the 7-bit delay 24 and loaded into the storage locations of the fourth level of the memory-1A.

After the next shift of data, the 4-bit delay 21 contains the fifth, sixth, seventh, and eighth bits of data from line DATA 1. The WA and WB clock pulses again cause the multiplexers 25, 26, 27, and 28 to accept the data on their first inputs. The first W2 gate pulse, together with the WA and WB clock pulses, cause this data to be loaded into the four storage locations of the first level of the next memory-2A. In the manner similar to the foregoing explanation, on the second, third, and fourth W2 gate pulses, the fifth, sixth, seventh, and eighth data bits from lines DATA 2, DATA 3, and DATA 4 are loaded into the storage locations of the second, third, and fourth levels, respectively, of the second memory-2A of the set. The apparatus continues to operate in this manner during the 64-bit message input period until the W16 clock pulses load the last four bits of data for each message into the proper levels of the last memory-16A 96 of the set.

Figure 4:
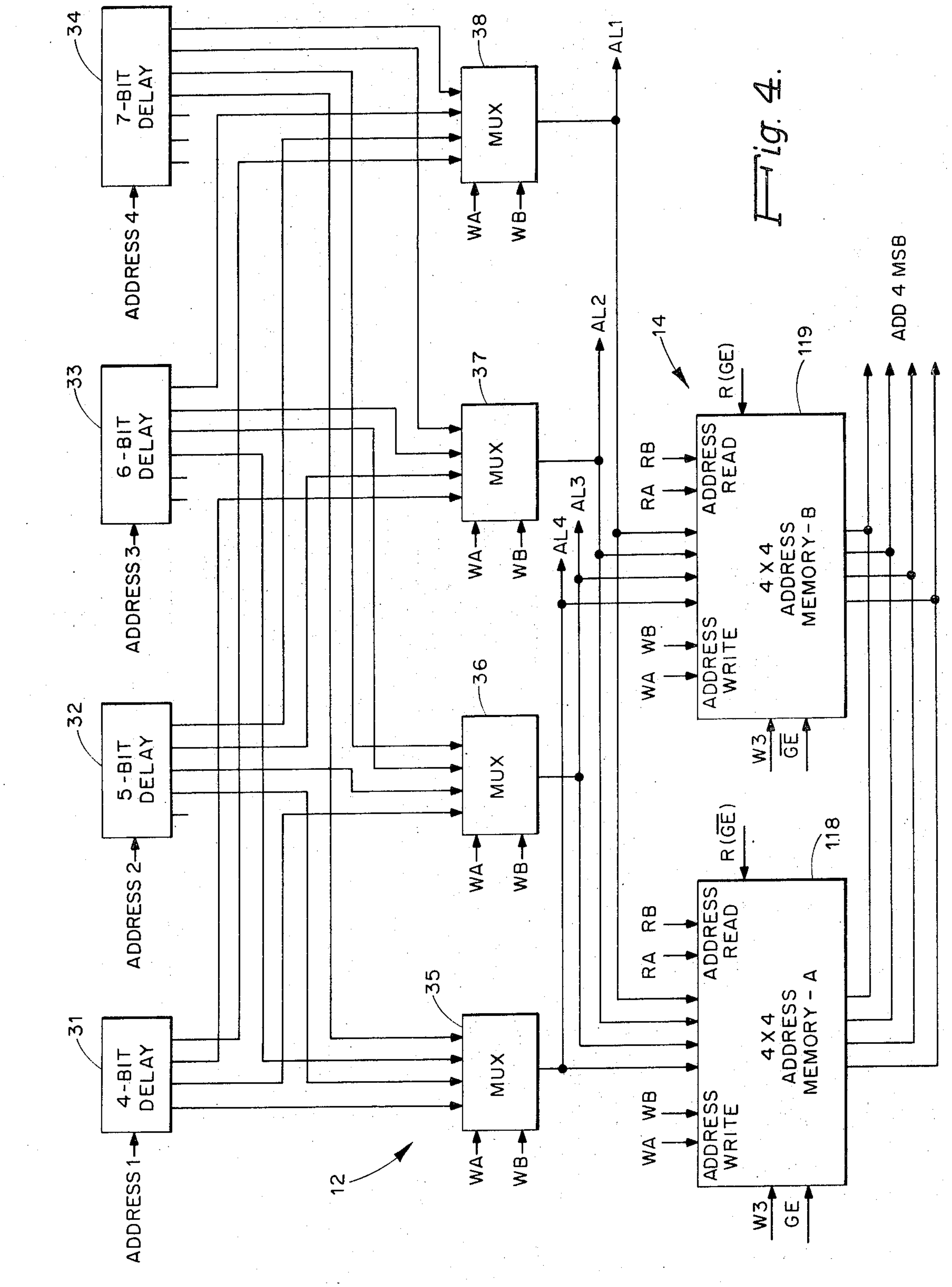
FIG. 4 is a detailed block diagram of the address storage control and a portion of the address storage section of the system.

The aforementioned address storage control 12 and the 4 MSB address storage section 14 of FIG. 1 are shown in detail in FIG. 4. The aforementioned 5 LSB address storage section 15 of FIG. 1 is shown in detail in FIG. 5. The address information from the address lines ADDRESS 1, ADDRESS 2, ADDRESS 3, and ADDRESS 4 which accompanies data on the corresponding data input lines are applied to 4-bit, 5-bit, 6-bit, and 7-bit delays 31, 32, 33, and 34, respectively. The last four stages of the delays are connected to multiplexers 35, 36, 37, and 38. The outputs of the multiplexers 35, 36, 37, and 38, labeled AL4, AL3, AL2, and AL1, respectively, are applied to two 4 × 4 address memories; address memory-A 118 and address memory-B 119. These memories are for storing the four most significant bits of the 9-bit address codes. The connections of the address lines, delays 31, 32, 22, and 34, multiplexers 35, 36, 37, and 38, and memories 118 and 119 are the same as corresponding elements for handling data bits of FIG. 3.

Figure 5:
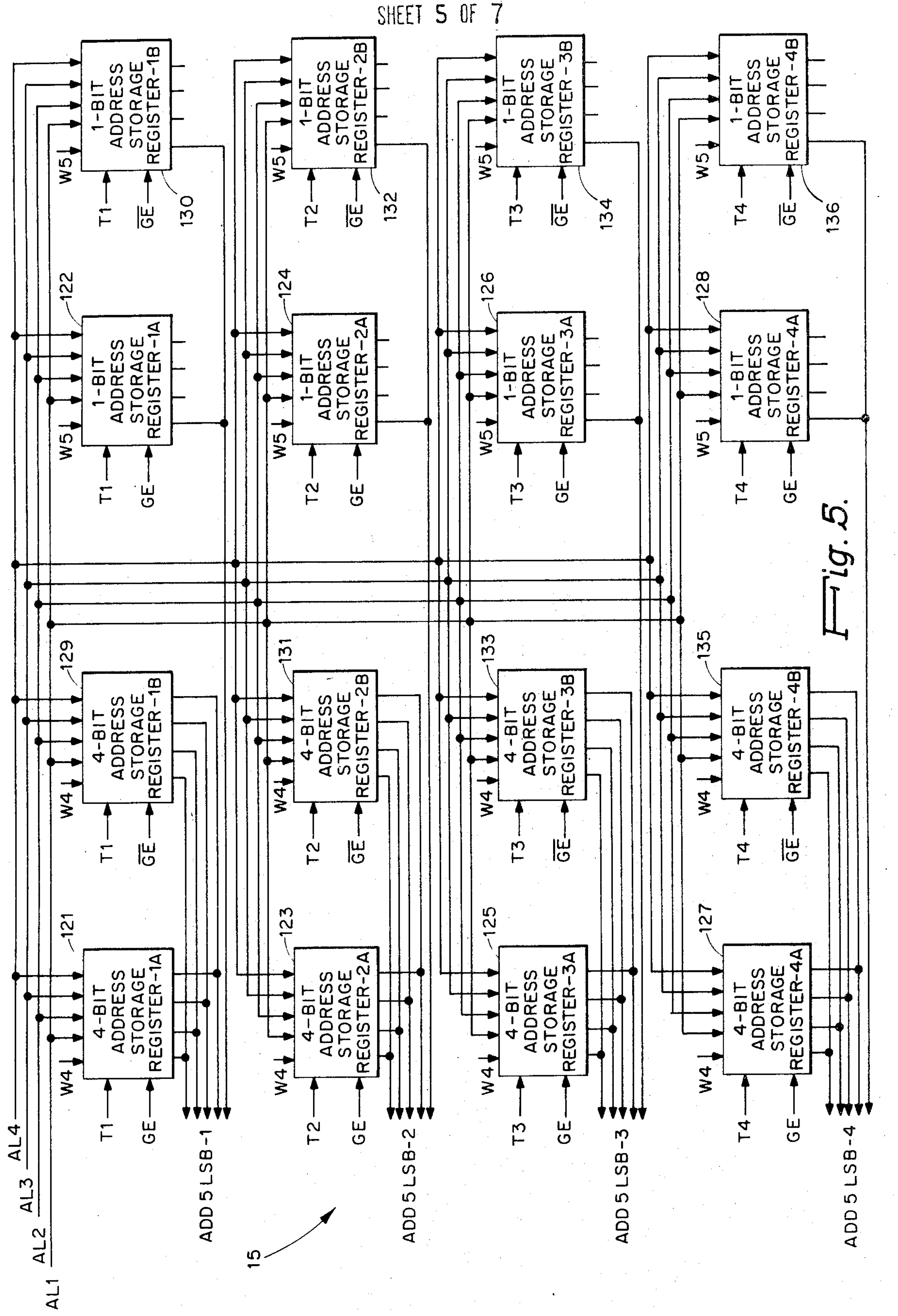
FIG. 5 is a detailed block diagram of another portion of the address storage section of the system.

The five least significant bits of each address code are stored in the 5 LSB address storage section 15 shown in detail in FIG. 5. Each five bits is stored in individual 4-bit and 1-bit registers. The five least significant bits of an address received on line ADDRESS 1 are stored either in the A registers 121 and 133 or the B registers 129 and 130. Similar A and B sets of registers are provided for storing the address information received on lines ADDRESS 2, ADDRESS 3, and ADDRESS 4.

The output lines AL4, AL3, AL2, and AL1 from the multiplexers 35, 36, 37, and 38 of the address control 12 of FIG. 4 are connected to the storage locations of the A and B sets of address storage registers of FIG. 5. The GE signal is applied to the A set of registers and the $\overline{GE}$ signal to the B set in order to enable them. The T1, T2, T3, and T4 gating pulses are applied to the appropriate registers which are to store address information received from the lines ADDRESS 1, ADDRESS 2, ADDRESS 3, and ADDRESS 4, respectively.

The address storage control 12 operates in the same manner as the similar portion of the data storage section 11. In the particular embodiment under discussion address information is not received until after eight bits of data information have been received. Therefore, again assuming a GE signal, the four most significant bits of the four address codes are loaded into the storage locations of the four levels of the address memory-A 118 during the four W3 gating pulses, respectively. The next four address bits, which are four of the five least significant bits, are loaded into the appropriate 4-bit address storage registers-1A 121, –2A 123, –3A 125, and –4A 127 on the first, second, third, and fourth W4 gate pulses, in combination with gating pulses T1, T2, T3, and T4. The last of the five least significant address bits are loaded into the appropriate 1-bit address storage registers –1A 122, –2A 124, –3A 126, and –4A 128 on the first, second, third, and fourth W5 gating pulses, in combination with gating pulses T1, T2, T3, and T4. Thus, the address information is loaded into the appropriate storage locations of the address memory sections 14 and 15 at the same time as the data information is loaded into the data memory section 11.

ANALYSIS OF ADDRESS INFORMATION

Figures 6, 7:
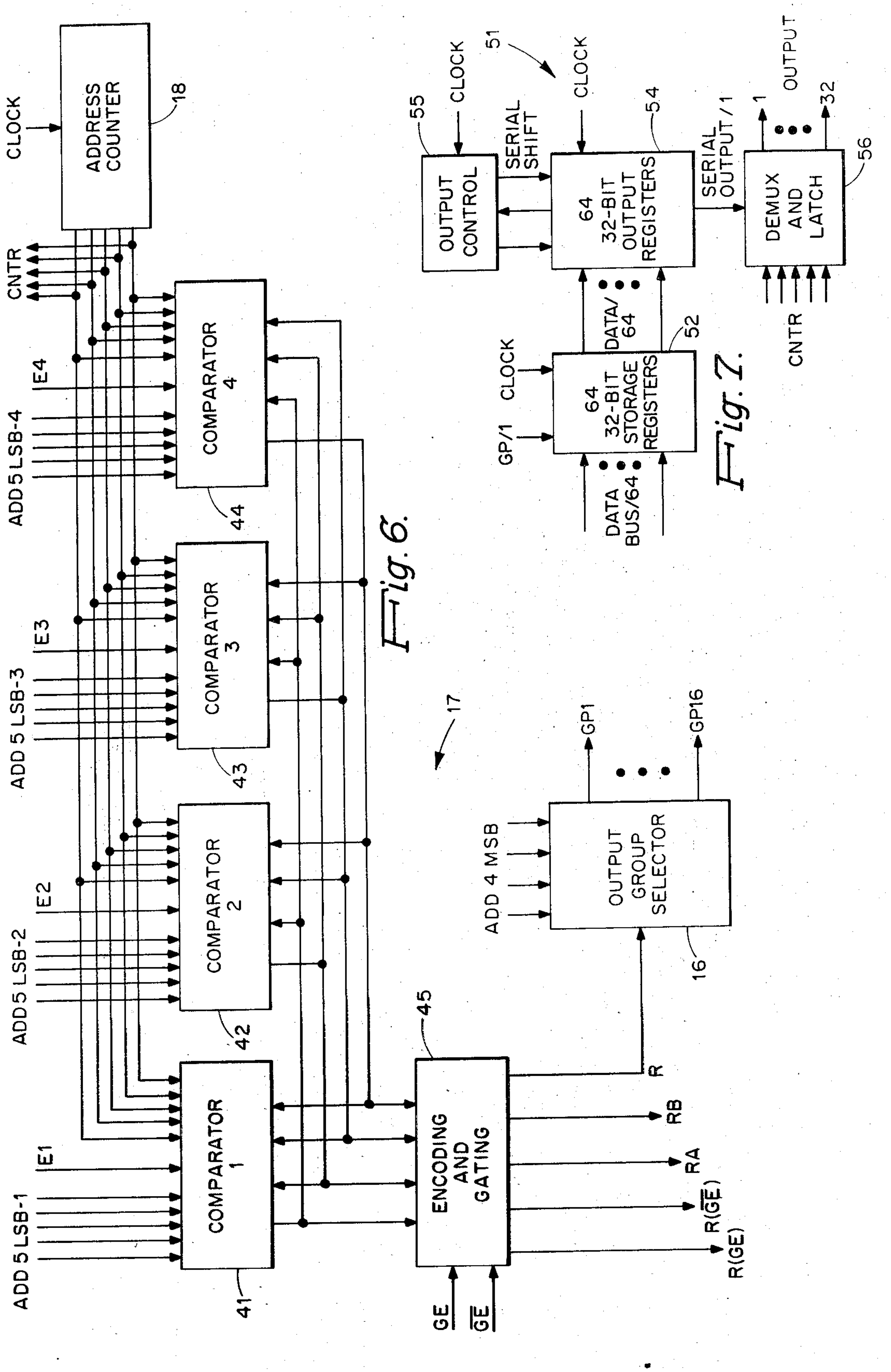
FIG. 6 is a detailed block diagram of portions of the system for analyzing the stored address information.
FIG. 7 is a block diagram of one segment of the output section of the system.

The stored address information is analyzed by the aforementioned comparator section 17 and the output group selector 16, which are shown in detail in FIG. 6, under control of the address counter 18. The comparator section includes four comparators 41, 42, 43, and 44. Comparator-1 41 is connected to the ADD 5 LSB–1 lines from the address storage registers-1A 121 and 122 and -1B 129 and 130, comparator-2 42 is connected to the ADD 5 LSB–2 lines from the address storage registers-2A 123 and 124 and –2B 131 and 132, comparator-3 43 is connected to the ADD 5 LSB–3 lines from the address storage registers-3A 125 and 126 and –3B 133 and 134 and comparator-4 44 is connected to the ADD 5 LSB-4 lines from the address storage registers-4A 127 and 128 and –4B 135 and 136. Each of the four comparators is also connected to the 5-bit address counter 18. The comparators 41, 42, 43, and 44 are enabled by appropriate enabling signals E1, E2, E3, and E4, respectively, from the control section 13.

In the foregoing discussion, it was assumed that a GE signal was being produced by the control section 13 while the data and address information were being received and stored. Since the GE signal was present, the information was stored in the A sets of memories. Upon completion of the 64-bit message input period the control section 13 performs a check, as will be discussed in detail hereinbelow, to determine whether or not the system is clear so that the information in the A sets of memories can be further processed. If the system is properly cleared, then the GE signal terminates and the control section 13 produces a $\overline{GE}$ signal. In addition, the control section 13 produces enabling signals E1, E2, E3, and E4, in a manner to be explained hereinbelow, depending on which of the corresponding input lines received information which is now stored in the memories.

The removal of the GE signal prevents the A sets of address storage registers of the address storage section 15 from receiving further information and also causes the address bits stored therein to be applied by way of lines ADD 5 LSB-1, -2, -3, and -4 to the corresponding comparators 41, 42, 43, and 44. Appropriate enabling signals E1, E2, E3, and E4 from the control section 13 enable the comparators to which information is being applied. The applied information on the five least significant bits of the stored addresses is compared with the output of the 5-bit binary address counter 18. The address counter counts repeatedly through a count of 32 at the input bit rate of 768 KHz. The output of the address counter 18 is also applied to the output section 19.

When the address counter 18 produces a count equal to the count of five least significant bits applied to one of the comparators 41, 42, 43, or 44 by the address storage registers, that comparator produces an output pulse. The comparator output pulse is applied to the other three comparators inhibiting them thus preventing more than one comparator from producing an output pulse at the same instant. The comparator output pulse is applied to an encoding and gating arrangement 45 over the appropriate one of four input lines.

In response to a pulse from one of the comparators 41, 42, 43, or 44 indicating a match the encoding and gating arrangement 45 produces several read pulses simultaneously. The particular comparator or input line to the encoding and gating arrangement 45 is identified by the presence or absence of pulses in combination on lines RA and RB. A pulse is produced on line R($\overline{GE}$) or R(GE) depending on whether a GE or $\overline{GE}$ signal is present. A pulse is also produced on line R.

The RA and RB pulses are applied to the address memories in the 4 MSB address storage section 14 and address the proper level of the memory. The R($\overline{GE}$) read pulse causes address memory-A 118 to be read out. Thus, the four most significant bits of the associated address are applied over the ADD 4 MSB lines to the output group selector 16, which is shown in FIG. 6.

The R pulse gates the ADD 4 MSB information into the output group selector 16. The output group selector decodes the information and produces a pulse on the appropriate one of 16 output group selector lines GP1–GP16. The particular line identifies the proper one of the 16 segments of the output section 19 containing the proper output line.

At the same time that the read out pulses from the encoding and gating arrangement 45 are causing the four most significant bits of the address to be read out of the address memory-A 118 they are also causing the associated 64 data bits to be read out of the data memories-1A through 16A 81–96. The RA and RB signals address the appropriate level in the data memories and the R($\overline{GE}$) signal causes the A set of data memories to be read out. The 64 data bits are applied in parallel to the 16 segments of the output section 19 over the 64 line data bus.

OUTPUT SECTION

A segment 51 of the output section 19 containing one group of 32 output lines is illustrated in FIG. 7. The output section 19 includes a total of 16 of these segments. A segment includes an arrangement of 64 32-bit storage registers 52. Each of the 64 lines of the data bus is connected to the input of a different one of the storage registers. One of the 16 lines GP1–GP16 from the output group selector 16 is connected to the storage registers 52 of the segment 51. A pulse on the line GP1–GP16 to the segment causes the storage registers 52 of the particular segment to accept the 64 bits of data on the data bus. The storage registers 52 each circulate the received data at the rate of 768 KHz. Since the time at which the data was loaded into the storage registers 52 is determined by the address counter 18, also operating at the 768 KHz rate, its location in the storage registers at any instant is an indication of the count which was present in the counter 18 when loading took place.

Data shifts from the inputs to the outputs of the storage registers 52 over a 32-bit period. The data is shifted from the outputs of the storage registers 52 in parallel to 64 32-bit output registers 54 which also circulate data at the 768 KHz rate. An output control 55 determines whether or not the output registers 54 contain older data which is in the input stages when the data is to be received from the storage registers 52. If so, the data is not accepted by the output registers 54 and is re-circulated in the storage registers 52 for another 32-bit period. When at the end of a 32-bit circulation period of the storage registers 52 the output control 55 determines there is no data in the input stages of the output registers 54, the output registers 54 accept the data.

The output registers 54 also shift data from register to register toward a serial output connection. The data bit at the output of each output register except the last one in the series is shifted to the input of the next register in series, and the data bit at the output of the last register is shifted to the serial output connection under the control of serial shift pulses from the output control 55. The serial output is connected to a demultiplexer and latch 56 which is controlled by the address counter 18. The outputs from the demultiplexer and latch 56 are the group of 32 output lines of the segment.

If data is shifted out of the output registers 54 by the output control 55 at the 768 KHz rate, each succeeding bit for any one message will be read out every 32-bit period. Since the circulation periods of the storage registers 52 and the output registers 54 are 32-bit periods, the same as the address counter 18, each bit is directed by the demultiplexer 56 to its proper output line.

The output control 55 may be employed to shift data serially from the outputs of each register to the inputs of the next register of the output registers at a lesser rate than 768 KHz. Any such variations in the serial shift rate will vary the rate at which data is supplied to the output lines. However, since the storage registers 52, the output registers 54, and the demultiplexer and latch 56 all operate at the 768 KHz rate with a 32-bit period, the position of data is in phase with the count of the address counter 18 which caused the data to be read out of the data memories received in the storage register 52. Thus, each data bit is directed to the proper output line as designated by the five least significant bits of its address.

LOADING AND SORTING CONTROL

Figure 8:
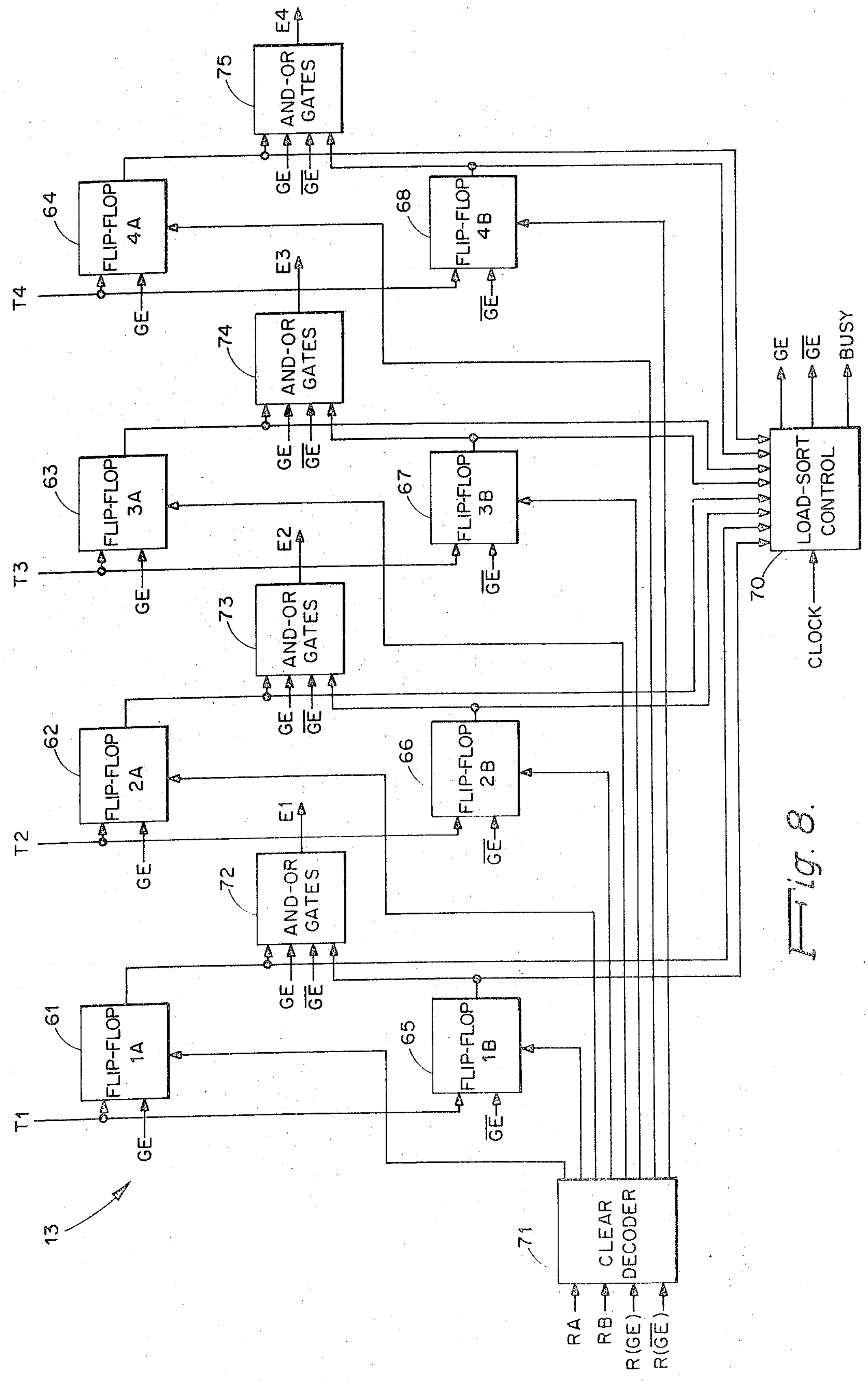
FIG. 8 is a block diagram of the control section of the system.

The control section 13 which controls the loading of information into the A memories or the B memories and determines when the system is clear to process stored information and to accept new information is illustrated in detail in FIG. 8. The control section 13 includes a first set of four A flip-flops 61–64 and a second set of four B flip-flops 65–68 which are set individually to indicate the presence of data and address information within the system. The status of these flip-flops which are bistable elements is employed to control the loading of information into the system and the analyzing of information stored in the system.

The control section 13 also includes a load-sort control 70 connected to the outputs of all eight flip-flops. A clock pulse is applied to the load-sort control 70 at the end of each message input period of 64 bits. The clock pulse is applied at the end of each message period regardless of whether or not there were any messages received during the period. The clock pulse may be obtained by counting through every 64 of the 768 KHz clock pulses, or may be separately generated. The load-sort control 70 produces a GE or $\overline{GE}$ signal as shown in FIG. 2 depending on the status of the flip-flops on the occurrence of each 64-bit clock pulse at the end of a message input period.

It is assumed for purposes of discussing the operation of the control section 13 that the load-sort control 70 is producing a GE signal. As explained previously, the presence of a GE signal causes received information to be loaded into the A sets of memories, and information previously stored in the B sets of memories to be analyzed and read out. The presence of incoming messages causes appropriate ones of gating pulses T1, T2, T3, and/or T4 to be produced by the load timing circuitry 10 as explained hereinabove. With the presence of a GE signal, these gating pulses cause corresponding A flip-flops 61, 62, 63, and/or 64 to be set.

Upon completion of the message input period, a clock pulse to the load-sort control 70 causes the load-sort control to change state and produce a $\overline{GE}$ signal rather than a GE signal, but only if all the B set of flip-flops 65–68 are in a cleared condition. As will be explained hereinbelow, the B set of flip-flops will all be in the clear condition only if all previously stored information was read out of the B sets of memories while the GE signal was present. If the B set of flip-flops 65–68 have not been cleared, a BUSY signal is produced by the load-sort control 70. This signal may be employed in other portions of the equipment which are not shown in order to prevent additional messages from being transmitted to the system since the system is not ready to accept them. If the BUSY signal is produced, the load-sort control 70 does not change state and continues to produce the GE signal. At the termination of the next 64-bit message input period the clock pulse causes the load-sort control 70 to again check the B set of flip-flops 65-68, and if they have become cleared, the BUSY signal and the GE signal are terminated and a $\overline{GE}$ signal is produced.

The control section 13 also includes four arrangements of AND-OR gates 72, 73, 74, and 75 for producing enabling signals E1, E2, E3, and E4 to the comparators 41, 42, 43, and 44, respectively, of the comparator section 17. The first AND-OR gates 72 produce an enabling signal E1 when the 1A flip-flop 61 is set and the load-sort control 70 is producing a $\overline{GE}$ signal, or when the 1B flip-flop 65 is set and the GE signal is being produced by the load-sort control 70. The other AND-OR gates operate in similar manner depending upon the states of the corresponding flip-flops and the GE or $\overline{GE}$ signal. Thus, the comparators 41, 42, 43, and 44 are individually enabled only if there is stored information to be processed thereby.

The flip-flops are individually cleared by the read out signals from the encoding and gating arrangement 45 of the comparator section 17 when it receives a comparator output pulse from one of the comparators 41, 42, 43, or 44. The RA and RB combination of signals identify the appropriate flip-flop by number and the R(GE) or R($\overline{GE}$) pulse indicates whether it is in the A or B set. A clear decoder 71 receives the read out pulses and produces a clear signal to the appropriate flip-flop restoring it to its cleared state, thus indicating that the data and address information which was stored when the flip-flop was set have now been read out and those portions of the memories are now ready to receive new information.

Thus, the system as shown and described is capable of receiving up to four messages simultaneously and transferring the data content of the messages to any one of 512 (32 × 16) output lines. New information can be received while previously received information is being analyzed and read out. Even though the number of possible addresses is large, the time required for analyzing the address information and reading out the data on the proper output line is relatively short. This result is obtained by the combination of repeatedly scanning through the five least significant bits of the address and decoding the four most significant bits. This manner of analyzing the address information permits data to be read out on 16 groups of 32 output lines with the 16 groups being accessed in parallel and only 32 scanning steps being necessary to scan through the entire 512 lines.

While there has been shown and described what is considered a preferred embodiment of the present invention, it will be obvious to those skilled in the art that various changes and modifications may be made therein without departing from the invention as defined in the appended claims.

What is claimed is:

1. Data transfer apparatus including in combination a plurality of input channels for receiving messages including data information and associated output address information;

a plurality of output channels;

the output address information of each message designating a particular one of the output channels;

first data storage means for storing the data information of each message received on said input channels when enabled;

second data storage means for storing the data information of each message received on said input channels when enabled;

first address storage means for storing the output address information of each message received on said input channels when enabled;

second address storage means for storing the output address information of each message received on said input channels when enabled;

analyzing means for analyzing the output address information stored in an address storage means to determine the particular one of the output channels designated thereby and to produce an indication thereof;

readout means operable in response to the producing of an indication to read out the associated data information from a data storage means;

output means coupled to the first and second data storage means, the plurality of output channels, and the analyzing means, said output means being operable to apply the data information read out of a data storage means to the particular one of the output channels as determined by the indication from the analyzing means;

control means operable during a first period to enable the first data storage means and the first address storage means whereby data information and output address information received on the input channels during a first period are stored in the first data storage means and first address storage means, respectively;

said control means being operable during a second period to enable the second data storage means and the second address storage means whereby data information and output address information received on the input channels during a second period are stored in the second data storage means and second address storage means, respectively;

said control means being operable during a first period to permit the analyzing means to analyze the output address information stored in the second address storage means and to cause the readout means in response to the producing of an indication by the analyzing means to read out the associated data information from the second data storage means whereby data read out of the second data storage means is received by the output means during a first period; and said control means being operable during a second period to permit the analyzing means to analyze the output address information stored in the first address storage means and to cause the readout means in response to the producing of an indication by the analyzing means to read out the associated data information from the first data storage means whereby data read out of the first data storage means is received by the output means during a second period.

2. Data transfer apparatus in accordance with claim 1 wherein said control means is coupled to said first and second data storage means, said first and second address storage means, and said readout means, and is operable during a first period to produce a first signal, and is operable during a second period to produce a second signal;

said first data storage means includes a plurality of portions each being operable to store the data information received on a different one of said input channels during a first signal from said control means;

said second data storage means includes a plurality of portions each being operable to store the data information received on a different one of said input channels during a second signal from said control means;

said first address storage means includes a plurality of portions each being operable to store the output address information received on a different one of said input channels during a first signal from said control means and being operable to apply the output address information stored therein to said analyzing means during a second signal from said control means;

said second address storage means includes a plurality of portions each being operable to store the output address information received on a different one of said input channels during a second signal from said control means and being operable to apply the output address information stored therein to said analyzing means during a first signal from said control means; and said readout means being operable in response to an indication from said analyzing means during a first signal from said control means to read out the data information from the associated portion of the second data storage means, and being operable in response to an indication from said analyzing means during a second signal from said control means to read out the data information from the associated portion of the first data storage means.

3. Data transfer apparatus in accordance with claim 2 wherein said control means includes first indicating means for indicating the presence or absence of data information in the portions of the first data storage means;

second indicating means for indicating the presence or absence of data information in the portions of the second data storage means; and signal control means operable to terminate a first signal and produce a second signal only when said second indicating means indicates that no data information is present in the portions of the second data storage means and operable to terminate a second signal and produce a first signal only when said first indicating means indicates that no data information is present in the portions of the first data storage means.

4. Data transfer apparatus in accordance with claim 3 wherein said first indicating means includes a plurality of first bistable means each being coupled to a different one of said plurality of input channels and to said signal control means, each of said first bistable means being operable to be triggered to an indicating state in response to a message being received on the associated input channel during a first signal from said signal control means;

said second indicating means includes a plurality of second bistable means each being coupled to a different one of said plurality of input channels and to said signal control means, each of said second bistable means being operable to be triggered to an indicating state in response to a message being received on the associated input channel during a second signal from said signal control means;

said control means includes clearing means coupled to said readout means and to each of said bistable means, said clearing means being operable to trigger a first bistable means from the indicating state to a cleared state in response to the readout means causing the data information to be read out of the associated portion of the first data storage means while the signal control means is producing a second signal, and said clearing means being operable to trigger a second bistable means from the indicating state to a cleared state in response to the readout means causing the data information to be read out of the associated portion of the second data storage means while the signal control means is producing a first signal; and said signal control means being coupled to said plurality of first bistable means and to said plurality of second bistable means, said signal control means being operable to terminate a first signal and produce a second signal only when all of said second bistable means are in the cleared state and being operable to terminate a second signal and produce a first signal only when all of said first bistable means are in the cleared state.

5. Data transfer apparatus in accordance with claim 4 wherein said control means includes a plurality of enabling means each being coupled to a different first bistable means and a different second bistable means, the first and second bistable means coupled to an enabling means being coupled to the same one of said plurality of input channels, each of said enabling means being coupled to said signal control means and to said analyzing means;

each of said enabling means being operable to produce an enabling signal to said analyzing means permitting said analyzing means to analyze the output address information applied thereto from the associated portion of an address storage means when the first bistable means coupled to the enabling means is in the indicating state and a second signal is being produced by the signal control means or when the second bistable means coupled to the enabling means is in the indicating state and a first signal is being produced by the signal control means.

* * * * *